United States Patent
Petersen et al.

(10) Patent No.: US 10,648,798 B2
(45) Date of Patent: May 12, 2020

(54) APPARATUS FOR PROJECTING A TIME-VARIABLE OPTICAL PATTERN ONTO AN OBJECT TO BE MEASURED IN THREE DIMENSIONS

(71) Applicant: Cognex Corporation, Natick, MA (US)

(72) Inventors: Jens Petersen, Jena (DE); Martin Schaffer, Jena (DE); Bastian Harendt, Jena (DE)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 16/221,539

(22) Filed: Dec. 16, 2018

(65) Prior Publication Data

US 2019/0137267 A1    May 9, 2019

Related U.S. Application Data

(63) Continuation of application No. PCT/EP2017/065114, filed on Jun. 20, 2017.

(30) Foreign Application Priority Data

Jun. 20, 2016  (DE) .................. 10 2016 111 228
Jun. 20, 2017  (DE) .................. 10 2017 113 475

(51) Int. Cl.
*G01B 11/25* (2006.01)
*G02B 26/02* (2006.01)
(Continued)

(52) U.S. Cl.
CPC ...... *G01B 11/2527* (2013.01); *G01B 11/2513* (2013.01); *G01B 11/2536* (2013.01);
(Continued)

(58) Field of Classification Search
CPC .. G03B 21/606; G03B 35/24; G02B 27/2221; G02B 27/2214; H04N 13/0404
(Continued)

(56) References Cited

U.S. PATENT DOCUMENTS 5,714,832 A  *  2/1998  Shirrod ................. A61B 1/227
                                                      310/328
2005/0243330 A1*  11/2005  Magarill ............ G01B 11/2536
                                                      356/610
(Continued)

FOREIGN PATENT DOCUMENTS

EP    1302800    *   4/2003  ............... G02B 7/02
EP    1302800 A1      4/2003
EP    2905643 A1      8/2015

OTHER PUBLICATIONS

Piazo Nano Position 2013/2014 PrecisionPositioning Stage contents, Jan. 1, 2014, Catalog.

*Primary Examiner* — Clayton E. LaBalle
*Assistant Examiner* — Kevin C Butler
(74) *Attorney, Agent, or Firm* — Wolf, Greenfield & Sacks, P.C.

(57) ABSTRACT

A device for projecting a time variable optical pattern onto an object that is to be measured in three dimensions, the device comprising a frame for an optical pattern; a light source with optional illumination optics; and imaging optics, wherein the optical pattern is on slide that is attached to a movement mechanism that moves the optical pattern relative to the optional illumination optics and/or relative to the imaging optics, wherein the movement mechanism causes a movement of the optical pattern in a slide plane that is oriented orthogonal to an optical axis of the imaging optics.

18 Claims, 5 Drawing Sheets

(51) Int. Cl.
 *G03B 21/606* (2014.01)
 *G03B 35/24* (2006.01)
 *G02B 27/22* (2018.01)
 *H02N 2/02* (2006.01)

(52) U.S. Cl.
 CPC ....... *G02B 26/023* (2013.01); *G02B 27/2214* (2013.01); *G02B 27/2221* (2013.01); *G03B 21/606* (2013.01); *G03B 35/24* (2013.01); *H02N 2/02* (2013.01)

(58) Field of Classification Search
 USPC .......................................................... 359/458
 See application file for complete search history.

(56) References Cited

U.S. PATENT DOCUMENTS

2011/0292527 A1* 12/2011 Frankovich ............ G02B 7/004
 359/824
2016/0341925 A1* 11/2016 Ziolek .................... G02B 7/005

\* cited by examiner

APPARATUS FOR PROJECTING A TIME-VARIABLE OPTICAL PATTERN ONTO AN OBJECT TO BE MEASURED IN THREE DIMENSIONS

RELATED APPLICATIONS

This application is a continuation of International application PCT/EP2017/065114, filed on Jun. 20, 2017, claiming priority from German patent application 10 2016 111 228.3, filed on Jun. 20, 2016, and German patent application 10 2017 113 475.1, filed on Jun. 20, 2017, all of which are incorporated in their entirety by this reference.

FIELD OF THE INVENTION

The invention relates to a device for projecting a time-variable optical pattern onto an object to be measured in three dimensions

BACKGROUND OF THE INVENTION

For this purpose devices are known in the art where various patterns are projected onto the object to be measured. For this type of three-dimensional measuring patterns and projections with variable orientation have proven useful or necessary. For this purpose the projection is deflected for example by a wobbling mirror (DE 10 2011 101 476 A1). This device has several disadvantages and the most significant one is the following:

Since the wobbling mirror is arranged between the imaging optics of the slide projector and the object to be measured, the mirror has to be comparatively large in order not to limit the illuminated portion. This requires a large amount of installation space. Furthermore a rather complex engineering design is required due to the comparatively large mass of the mirror in order to prevent imbalances during rotation of the mirror.

The wobbling motion of the mirror does not only move the projected pattern but also the illuminated portion. The effectively useable measuring field that is illuminated in each position of the wobbling mirror by a pattern is therefore significantly smaller than the portion that is illuminated in a single position of the mirror. Therefore a large portion of the illumination power is not used for illuminating the measuring field.

In view of the short measuring times that are desirable as a matter of principle for three-dimensional measuring methods an optimum utilization of the illumination power is however very important.

BRIEF SUMMARY OF THE INVENTION

Thus, it is an object of the invention to overcome the recited disadvantages and to provide a device that facilitates projecting an optical pattern onto an object that is to be measured in a stable manner with minimum complexity and also in a movable manner.

The object is achieved by a device for projecting a time variable optical pattern onto an object that is to be measured in three dimensions, the device comprising a frame for an optical pattern; a light source with optional illumination optics; and imaging optics, wherein the optical pattern is on slide that is attached to a movement mechanism that moves the optical pattern relative to the optional illumination optics and/or relative to the imaging optics, wherein the movement mechanism causes a movement of the optical pattern in a slide plane that is oriented orthogonal to an optical axis of the imaging optics.

The dependent claims provide useful and/or advantageous embodiments.

The device for projecting a time variable optical pattern onto an object that is to be measured in three dimensions includes a frame for an optical pattern, a light source with illumination optics, and imaging optics wherein the optical pattern is on slide that is attached to a movement mechanism that moves the optical pattern relative to the illumination optics and relative to the imaging optics. Thus the movement mechanism causes a movement of the optical pattern in a slide plane that is oriented orthogonal to the optical axis of the imaging optics.

In one embodiment the linear movement mechanism includes an arrangement of linear guides that are crossed relative to each other in order to support the frame wherein the movement of the optical pattern is performed in superimposed linear movements that are facilitated by the crossed over linear guides. Crossed over designates an arrangement where both linear guides are not arranged parallel to each other. The linear guides can thus be in particular oriented perpendicular to each other.

In one embodiment the movement mechanism is configured in a form of a bearing that is fabricated into the frame and with a shaped element that rotates in the bearing in an eccentrical manner and that is driven by a motor.

In one embodiment the movement mechanism is configured by linear actuators engaging the frame wherein the linear actuators are configured as piezoelectrically moved lever arrangements.

The light source, the illumination optics, the imaging optics and at least one of the linear guides are connected with each other by a rigid base element in an advantageous configuration.

In one embodiment the linear actuators are controlled so that the frame is moved on a circular path.

In another embodiment the linear guides that are connected with the base element are arranged perpendicular to an effective direction of a gravitational force.

In one embodiment the movement mechanism includes two bearings that are provided in a floating and fixed bearing arrangement.

BRIEF DESCRIPTION OF THE DRAWINGS

The device is subsequently described based on embodiments with reference to drawing figures, wherein.

DETAILED DESCRIPTION OF THE INVENTION

Moving the optical pattern on a circular path has proven to be a rather simple. Thus, a very uniform adjustment of the projected patter structure is possible. In particular the projected pattern structure is always moved with constant velocity and no movement direction is preferred.

Figure 1:
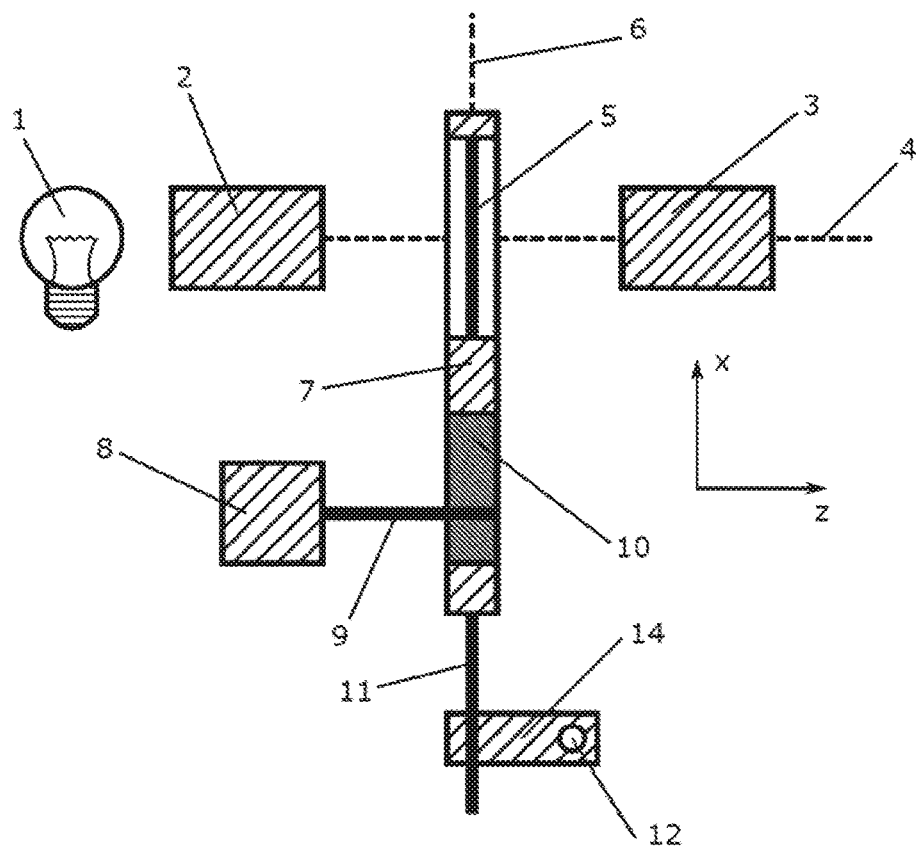
FIG. 1 illustrates a first view of an exemplary embodiment (view of the X-Z plane of the right-hand coordinate system)
Figure 2:
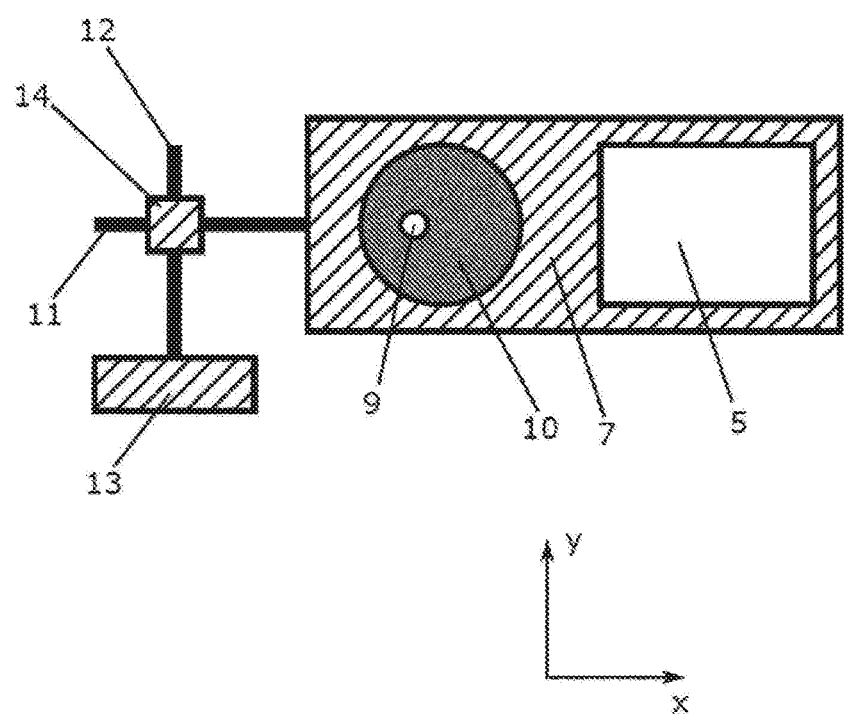
FIG. 2 illustrates a second view of the device illustrated in FIG. 1 (view of the X-Y plane of the right-hand coordinate system)

FIGS. 1-2 illustrate a first embodiment in several views.

The pattern projector includes a light source 1 with optional illumination optics 2, an optical pattern configured as a slide 5 and imaging optics 3. The illumination optics and the imaging optics have a common optical axis 4. The common optical axis is advantageous but not required. The slide 5 is illuminated by the light source 1 using the optional illumination optics 2 which is used e.g. for homogenizing and collimating the light. The illumination optics image the slide onto the measuring object (not illustrated). Thus, the slide 5 is between illumination optics 2 and imaging optics 3. The slide itself is connected with a mechanism that moves the slide relative to the light source and the optics.

In order for the optical pattern to always be imaged on the measuring object in a crisp manner at the same distance from the projector the slide plane 6 has to be oriented orthogonal to the optical axis 4 of the imaging optics 3 and the movement of the slide 5 must be performed exclusively parallel to the slide plane 6.

Thus, it is a function of the slide movement mechanism to assure that the movement of the slide 5 is performed parallel to the slide plane 6 and so that this slide plane is also maintained under external influences (e.g. gravity). The movement of the slide in the slide plane shall be performed in a uniform manner, advantageously the movement is performed on a circular path. The requirement for a fixed slide plane and a uniform movement is complied with by a suitable combination of different mechanical arrangements.

The optical pattern is provided on a slide 5 and connected with a mechanism that has the following features:

The slide 5 is arranged in a frame 7 that is connected through a bearing 10 with a motor 8. Thus, the motor axis 9 and the axis of the bearing 10 are arranged eccentrical relative to each other. Furthermore the frame 7 of the slide 5 is connected with two crossed linear guides 11, 12, so that the movement of the slide 5 with the frame 7 is limited to a purely linear movement.

In order to assure that the slide 5 is moved parallel to the slide plane 6 on a circular path, two crossed linear guides 11, 12 are respectively arranged parallel to the slide plane 6 and orthogonal to the motor axis 9. As a consequence, the motor shaft 9 is arranged orthogonal to the slide plane 6. As another consequence the optical axis 4 of the imaging optics 3 is arranged orthogonal to the linear supports 11, 12 and parallel to the motor axis 9. The linear guides 11, 12 can be arranged perpendicular to each other for practical purposes. This, however, is not mandatory. It is only necessary that the two linear guides 11, 12 are not arranged parallel to each other.

The light source 1, the optics 2, 3, the motor 8 and one of the linear guides 12 are fixated at each other by a rigid connection 13 subsequently designated as base plate. The frame 7 with the slide 5, the bearing 10 and the other linear guide 11 forms a first moving unit. The connection element 14 of the two crossed linear guides 11, 12 forms a second moving unit. The first moving unit is moved on a circular path in the slide plane 6. The second moving unit is moved back and forth in a straight line along the linear guide 12.

The arrangement of the linear guides 11, 12 is exchangeable. For example the linear guide 11 that is connected with the frame 7 is arranged horizontally in FIG. 2, parallel to the x-axis and the linear guide 12 that is connected with the base plate 13 is arranged vertically and parallel to the y-axis. However, it is also possible that the linear guide 12 that is connected with the base plate in a rigid manner is arranged horizontally and the linear guide 11 that is connected with the frame 7 is arranged vertically.

Furthermore the slide moving mechanism has the following features:

When selecting the arrangement of the crossed linear guides 11, 12 the actual direction of the gravitational force should be considered. When the linear guide 12 that is connected with the base plate 13 is arranged perpendicular to a direction of the gravitation force the connection element 14 of the linear guides 11, 12 only has to be moved perpendicular to the gravitational force by the motor 8. Thus, the motor 8 does not have to apply any additional force in order to move the connection element 14 parallel to the weight force. The linear guide 11 that is connected with the frame 7 therefore has to be arranged parallel to a direction of the gravitational force.

Thus, the linear guides 11, 12 can be implemented e.g. by a combination of a respective bolt with an adapted straight bearing or a respective bolt with an adapted linear bearing or a respective linear rail with a respective corresponding slide.

Figure 3:
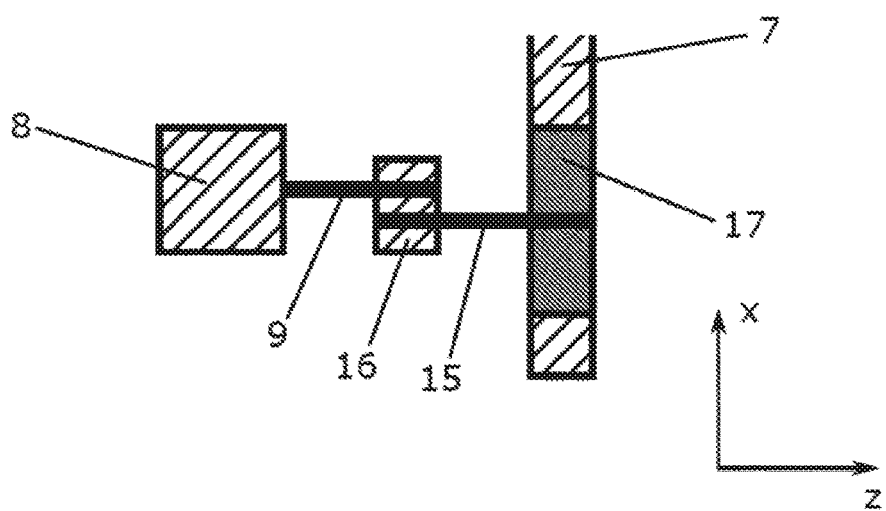
FIG. 3 illustrates a possible embodiment of the eccentrical element drive of the device illustrated in FIGS. 1 and 2.

The combination of motor shaft 9 and eccentrically arranged bearing 10 can be implemented as follows as illustrated in FIG. 3.

The shaft of the motor 8 is connected with a second shaft 15 that is oriented parallel to the motor axis 9 but moved perpendicular thereto. The two shafts are connected with each other in a rigid manner by a mechanism 16.

The second shaft 15 is centrally connected with a ball bearing 17 whose outer ring is connected in turn with the frame of the slide 5. A ball bearing typically also facilitates other rotations as a pure rotation about the axes of the ball bearing. This clearance facilitates that the slide that is connected with the ball bearing 17 by the frame 7 moves orthogonal to the desired slide plane 6. In order to suppress this play two ball bearings 17 are arranged in series on the shaft 15 in a fixed and floating bearing arrangement instead of a single ball bearing 17. This way the circular movement of the slide 5 can be limited precisely to the desired slide plane 6. This facilitates a constant crisp imaging of the slide 5 through the imaging optics 3 onto the measuring object that is not illustrated herein.

Figure 4:
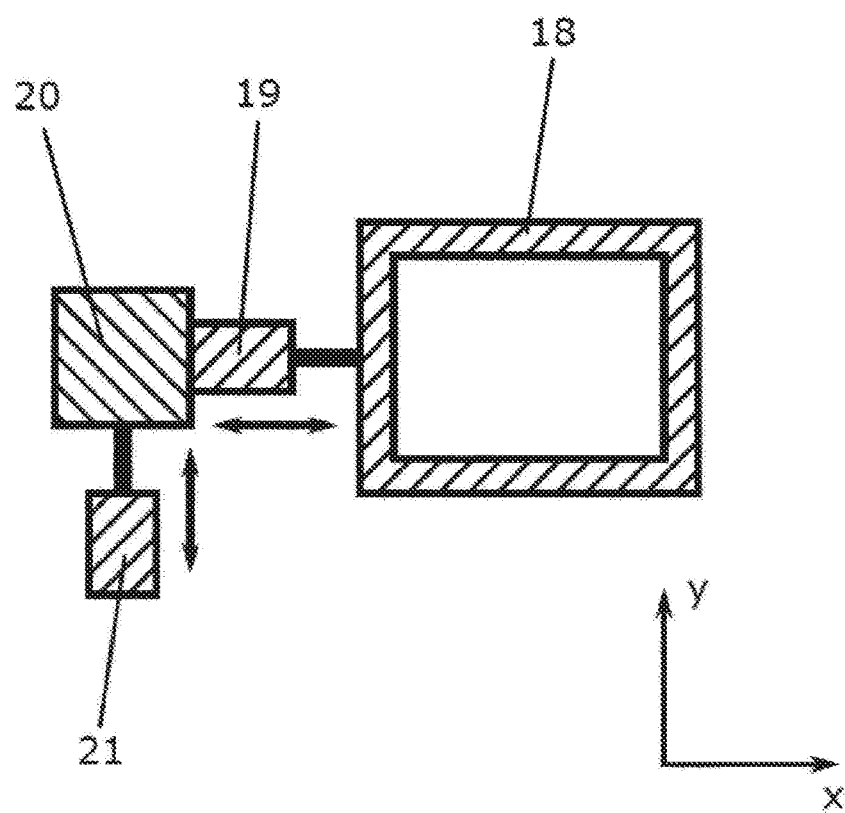
FIG. 4 illustrates an embodiment with a linear movement mechanism that is driven by a linear actuator.
Figure 5:
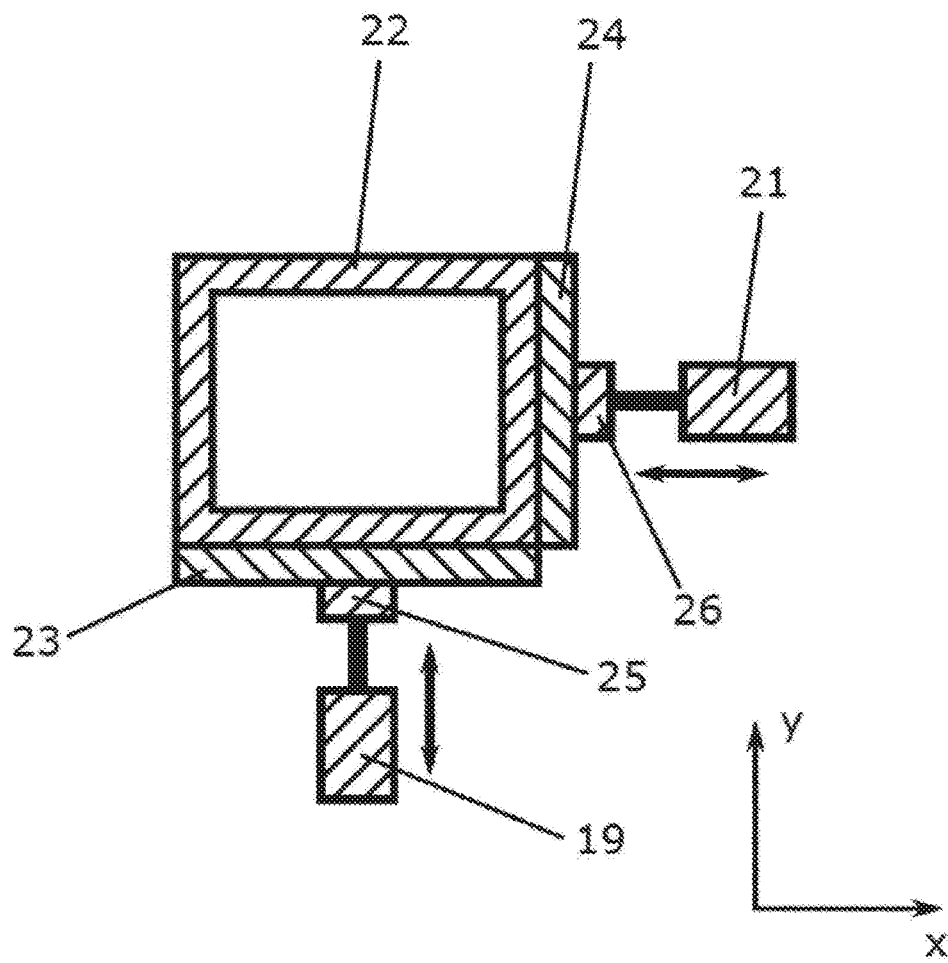
FIG. 5 illustrates another embodiment of a linear movement mechanism that is driven by a linear actuator.

FIGS. 4 and 5 illustrate alternative devices for implementing a slide moving mechanism using a linear actuator arrangement, e.g. piezo electro-magnetic, pneumatic or hydraulic actuators.

The slide is fixed at a frame 18. The frame 18 is fixed at a linear actuator 19 or at piezo actuator or a voice coil actuator which can move the frame along the X-axis. The linear actuator 19 is connected through a connection element 20 with another linear actuator 21, advantageously with a crossed movement direction. The additional linear actuator 21 moves the components 19 and 20 and thus also the frame 18 along the advantageously crossed direction.

Furthermore the slide moving mechanism includes the following features in this embodiment:

The linear actuators 19 and 21 can be additionally connected by a lever arrangement with the components 18 and 20 in order to increase a maximum movement travel. The linear actuators 19 and 21 can be respectively controlled so that the time based movement is performed according to a cosine function. When the phase shift between the respective curves is 90° and the frequency is identical a circular movement of the frame is achieved.

FIG. 5 illustrates another embodiment. In this embodiment the slide is fixated at a frame 22. Crossed linear guides 23, 24 are attached at the frame wherein a respective slide 25, 26 is movable on the linear guides. The slides 25, 26 are respectively fixed at a linear actuator 19, 21 or at a piezo actuator or a voice-coil actuator. The linear actuators that are also arranged crossed over move the slides and thus the connected frame 22 in a plane.

Furthermore the slide moving mechanism has the following features in this embodiment:

The linear actuators 19, 21 can be additionally connected by a lever device in order to increase a maximum movement travel using the first slide 25 and/or the second slide 26. The linear actuators 19, 21 can be respectively controlled so that the time based diagram respectively corresponds to a cosine function wherein different phase differences, frequencies and amplitudes are possible. When the phase shift between the respective diagrams is 90° for identical frequencies and amplitudes a circular movement of the frame is achieved. A movement along closed or non-closed Lissajous-figures is certainly also possible.

The device was described with reference to advantageous embodiments. The disclosed features can be combined into additional embodiments by a person skilled in the art.

REFERENCE NUMERALS AND DESIGNATION 1 light source
2 illumination optics
3 imaging optics
4 optical axis
5 slide
6 slide plane
7 frame
8 motor
9 motor shaft
10 bearing
11 first linear guide
12 second linear guide
13 base plate
14 connection element
15 shaft
16 mechanism
17 ball bearing
18 frame
19 first linear actuator
20 connection element
21 second linear actuator
22 frame
23 first linear guide
24 second linear guide
25 first slide
26 second slide

The invention claimed is:

1. A device for projecting a time variable movement of a fixed optical pattern onto an object that is to be measured in three dimensions, the device comprising:
   a frame for holding a slide having a fixed optical pattern;
   a movement mechanism attached to the frame;
   a light source including illumination optics; and
   imaging optics,
   wherein the movement mechanism moves the frame relative to the illumination optics or relative to the imaging optics, thereby causing a time variable movement of the fixed optical pattern on a circular path in a slide plane that is oriented orthogonal to an optical axis of the imaging optics.

2. The device according to claim 1, wherein:
   the movement mechanism comprises a set of linear guides that are configured to support the frame;
   each linear guide of the set is operable to move the fixed optical pattern in an associated direction to cause the time variable movement of the fixed optical pattern on the circular path.

3. The device according to claim 1,
   wherein the movement mechanism comprises a bearing that is fabricated into the frame, and
   wherein the bearing includes a shaped element configured to rotate in an eccentrical manner and that is driven by a motor.

4. The device according to claim 3, wherein the frame revolves on the circular path with constant path velocity.

5. The device according to claim 1, wherein:
   the movement mechanism comprises a set of piezoelectric linear actuators connected to the frame; and
   each piezoelectric linear actuator of the set is operable to move the frame in an associated direction to cause the time variable movement of the fixed optical pattern on the circular path.

6. The device according to claim 5, wherein the set of piezoelectric linear actuators are controlled so that the frame is moved on the circular path.

7. The device according to claim 1, wherein the light source, the illumination optics, the imaging optics and at least one linear guide of the movement mechanism are held in place with each other by a rigid base element.

8. The device according to claim 7, wherein the at least one linear guide is connected with the rigid base element and is disposed perpendicular to an effective direction of a gravitational force.

9. The device according to claim 1, wherein the movement mechanism includes two bearings that are provided in a floating and fixed bearing arrangement respectively.

10. A method for projecting a time variable movement of a fixed optical pattern onto an object that is to be measured in three dimensions, the method comprising:
    moving, using a device comprising a movement mechanism attached to a frame for holding a slide having a fixed optical pattern, the frame relative to a light source of the apparatus that includes illumination optics or relative to imaging optics of the apparatus, thereby causing a time variable movement of the fixed optical pattern on a circular path in a slide plane that is oriented orthogonal to an optical axis of the imaging optics.

11. The method according to claim 10, wherein:
    the movement mechanism comprises a set of linear guides that are configured to support the frame; and
    each linear guide of the set moves the fixed optical pattern in an associated direction to cause the time variable movement of the fixed optical pattern on the circular path.

12. The method according to claim 10,
    wherein the movement mechanism comprises a bearing that is fabricated into the frame, and
    wherein the bearing includes a shaped element configured to rotate in an eccentrical manner and that is driven by a motor.

13. The method according to claim 12, wherein the frame revolves on the circular path with constant path velocity.

14. The method according to claim 10, wherein:
    the movement mechanism comprises a set of piezoelectric linear actuators connected to the frame;
    each piezoelectric linear actuator of the set moves the frame in an associated direction to cause the time variable movement of the fixed optical pattern on the circular path.

15. The method according to claim 14, wherein the set of piezoelectric linear actuators are controlled so that the frame is moved on the circular path.

16. The method according to claim 10, wherein the light source, the illumination optics, the imaging optics and at least one linear guide of the movement mechanism are held in place with each other by a rigid base element.

17. The method according to claim 16, wherein the at least one linear guide is connected with the rigid base element and is disposed perpendicular to an effective direction of a gravitational force.

18. The method according to claim 10, wherein the movement mechanism includes two bearings that are provided in a floating and fixed bearing arrangement respectively.

* * * * *